R. C. COLE.
FUSE BLOCK.
APPLICATION FILED MAR. 23, 1912.

1,032,188.

Patented July 9, 1912.

2 SHEETS—SHEET 1.

Witnesses:
Josephine M. Strempfer.
Rebecca Itzkovitch

Inventor:
Robert Charles Cole, by
Harry P. Williams
atty

R. C. COLE.
FUSE BLOCK.
APPLICATION FILED MAR. 23, 1912.

1,032,188.

Patented July 9, 1912.
2 SHEETS—SHEET 2.

Witnesses:
Josephine M. Strempfer
Rebecca Itykovitch

Inventor:
Robert Charles Cole,
by Harry P. Williams atty.

UNITED STATES PATENT OFFICE.

ROBERT CHAS. COLE, OF HARTFORD, CONNECTICUT, ASSIGNOR TO THE JOHNS-PRATT COMPANY, OF HARTFORD, CONNECTICUT, A CORPORATION OF CONNECTICUT.

FUSE-BLOCK.

1,032,188.          Specification of Letters Patent.          Patented July 9, 1912.

Application filed March 23, 1912. Serial No. 685,820.

*To all whom it may concern:*

Be it known that I, ROBERT CHARLES COLE, a citizen of the United States, residing at Hartford, in the county of Hartford and State of Connecticut, have invented a new and useful Improvement in Fuse-Blocks, of which the following is a specification.

This invention relates to the arrangement of a fuse block which is particularly designed to be used in connection with an electric meter.

The object of the invention is to provide a very simple, cheap and compact block, which is so arranged that connections between the service or main line circuit wires and a meter, and between the meter and the load or branch line circuit wires can be easily and quickly made in such manner that the meter will be protected on both sides by fuses, and, whenever it is desired to test the meter, the fuses can be quickly manipulated or changed from one position to another and testing instruments can be readily connected and the test made without interfering with the load circuit or customers' current, and without eliminating the protection afforded to the circuits and to the meter and testing instruments by the fuses.

Figure 1:
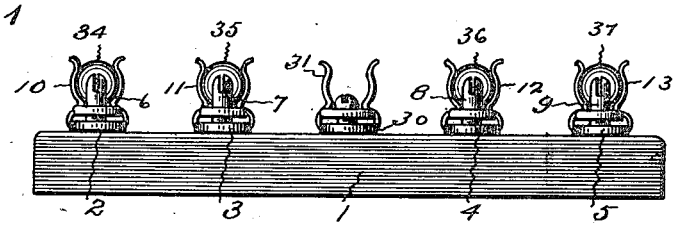
Figure 2:
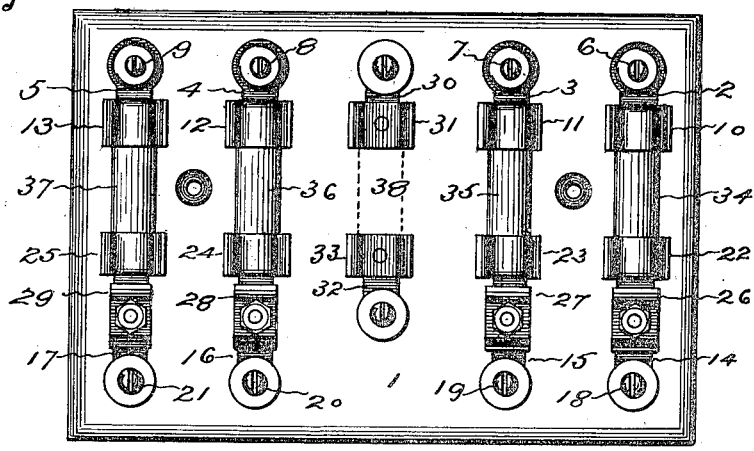
Figure 3:
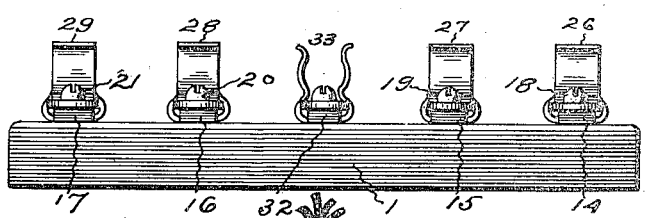
Figure 4:
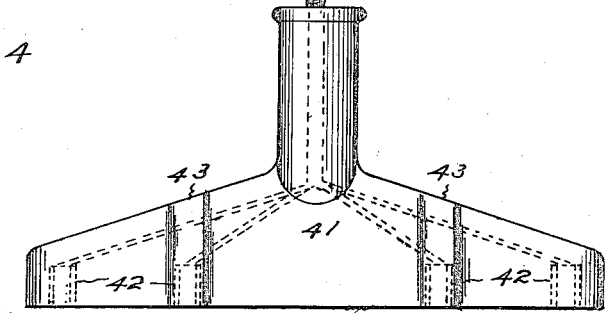
Figure 5:
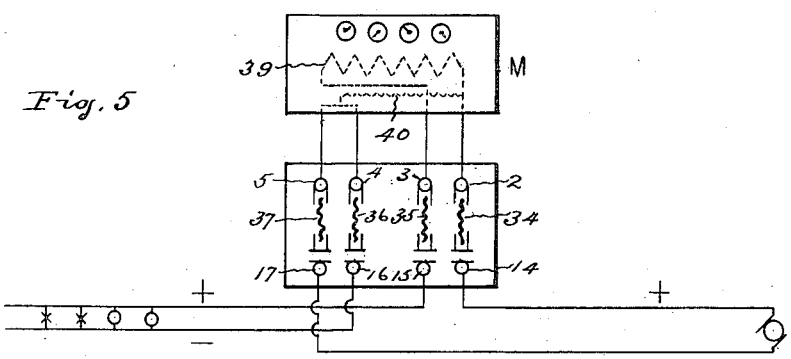
Figure 6:
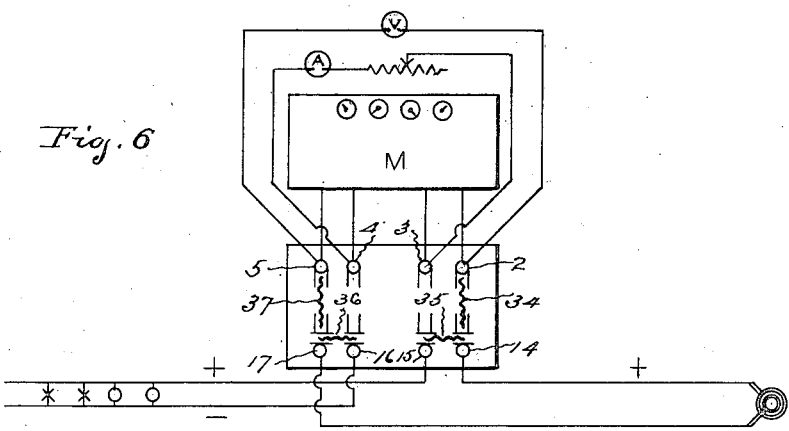
Figure 7:
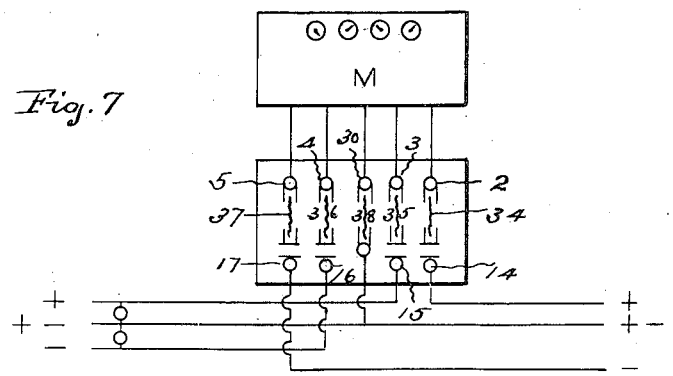

Figure 1 of the accompanying drawings is a view looking at the top edge of a meter connecting fuse block which embodies the invention. Fig. 2 shows a plan of the block. Fig. 3 is a view looking at the bottom edge of the block. Fig. 4 is a side view of an instrument connecting handle that may be used with this block. Fig. 5 is a conventional diagram indicating the electrical connections when this block is used in a two-wire system with the circuits in normal condition, that is, with the circuits arranged for regular service. Fig. 6 is diagram indicating the same circuits as they would be connected when a test was to be made. Fig. 7 is a diagram indicating the circuits when the block was to be used in a three-wire system, arranged in normal service condition.

The base 1 of the block is desirably made of porcelain, although it may be made of slate, molded compound, or any other suitable insulating material.

Contact plates 2, 3, 4, 5 are fastened to the face of the base near one edge. These plates are provided with binding screws for the connection of the wires to and from the meter, and they are shown as having outwardly projecting stud heads 6, 7, 8, 9. Electrically connected, longitudinally, to these contact plates are fuse clips 10, 11, 12, 13. Contact plates 14, 15, 16, 17 are fastened to the face of the base near the other edge. These contact plates have binding screws 18, 19, 20, 21 for the connection of the + and —, or feed and return, or outside wires, of the service and load circuits. The device is used with both direct current and with alternating current systems, but for convenience of description the service and load wires which are on one side of the circuit are hereafter termed "feed wires", and those on the other side are termed "return wires", whether they refer to direct or alternating current circuits. Electrically connected, longitudinally, to these contact plates are fuse clips 22, 23, 24, 25. Electrically connected, transversely, to these contact plates are fuse clips 26, 27, 28, 29. If the block is to be used in a two-wire system, these are all the fixed parts that are necessary to carry out the invention. If it is desired to use the block in a three-wire system, a contact plate 30 with a binding screw for the connection of the neutral meter lead, and a fuse clip 31 may be provided near one edge, and a contact plate 32 with a binding screw for the connection of the neutral service wire, and a fuse clip 33 may be attached near the other edge of the face of the block.

The clips shown are designed to receive and hold inclosed fuses of the cartridge type. Between the clips 10 and 22 is a fuse 34; between the clips 11 and 23 is a fuse 35; between the clips 12 and 24 is a fuse 36; and between the clips 13 and 25 is a fuse 37. When fused in this way the block is in complete condition for ordinary normal service in a two-wire system. If it is to be used in a three-wire system a fuse 38 may be put into the clips 31 and 33.

The positive, or feed, or outside line or service wire + may be connected with the contact plate 14, and the negative, return, or other outside line or service wire — may be connected with the contact plate 17. The positive, feed, or outside wire + of the load circuit may be connected with the contact 15 and the negative, return or other outside wire — of the load circuit may be connected with the contact 16, as indicated by the diagrams. The ampere coil or coils 39 of the meter M may be connected with the contacts 2 and 3, and one end of the potential coil 40 of the meter may be connected with the contacts 4 and 5, as indicated in Fig. 5. If the connections are made in this manner, the positive, or feed side + of the main or service circuit is connected with the positive, or feed side + of the load circuit through the contact 14, fuse 34, contact 2, meter, contact 3, fuse 35, and contact 15. The negative or return wires — of the load and service circuits are connected through the contact 16, fuse 36, contact 4, meter, contact 5, fuse 37, and contact 17. With such connections and the fuses arranged as shown in Figs. 2 and 5 of the drawings, the circuits are in condition for normal use, and there is a fuse on each side of the circuit on both sides of the meter. Thus the meter is protected from excess currents occuring from overloads or short circuits or grounds, either on the load or main lines. When it is desired to test a meter connected and protected in this way, the fuse 35 may be removed from the clips 11 and 23, and the fuse 36 may be removed from the clips 12 and 24, thus disconnecting the contacts 3 and 15 and the contacts 4 and 16. These fuses may then be placed, one between the clips 26 and 27, and the other between the clips 28 and 29, so as to connect the contacts 14 and 15 and the contacts 16 and 17.

It is desirable in practice to connect the clips 26 and 27 and the clips 28 and 29 with fuses before removing the fuses 35 and 36, for by doing this there is no danger of drawing an arc when the fuses 35 and 36 are pulled out. With the fuses 35 and 36 removed from the clips 11, 23 and 12, 24, and placed in the clips 26, 27 and 28, 29, the contacts 14 and 15, which were before disconnected are now connected, and the contacts 3 and 15, which were before connected are now disconnected, and the contacts 16 and 17, which were before disconnected are now connected, and the contacts 4 and 16 which were before connected are now disconnected. Arranging the fuses in this way bridges both sides of the line and practically short-circuits the meter without however leaving either the meter or the load lines unprotected by fuses, as indicated in Fig. 6. When the fuses are in this relation, connecting one side of a voltmeter V with the contact 2 and the other side with the contact 5, puts the voltmeter across the main lines. Connecting one terminal of a portable standard, or ammeter A and variable resistance with the contact 3 and connecting the other terminal of such an instrument with the contact 4 puts the testing instrument in series with the meter as indicated in Fig. 6, the connections between the meter and the block being shown in Fig. 5. In this case the load circuit is not interrupted, but the volt meter is connected across the line, and the portable standard, or ammeter and variable resistance, or artificial load, is connected in series with the meter, in a circuit that is in shunt with the service and load wires as now connected. This is but an illustrative connection, and is one in which current from the main source of supply is utilized to make the test. For the purpose of making these testing instrument connections quickly a terminal handle 41 may be provided. This handle may have in one edge a number of conducting sockets 42 connected with the proper lead wires for the testing instruments. To connect the instruments with the circuits for testing purposes, by one act the metallic terminal sockets in the handle are thrust upon the binding screw studs 6, 7, 8, 9. It is desirable to provide this handle with ribs 43 on its sides so that the sockets cannot be thrust upon the studs for connecting the testing instruments until after the fuses 35 and 37 have been removed, and the meter lines opened. When the testing instruments are connected in this manner, the potential of the line may be read and the meter may be tested and compared without in any way interfering with the load lines or the current supplied to a customer, for the meter and the measuring instruments with which the meter is in series are connected in multiple with the load.

When it is desired to use the block with a three-wire system, and provide a meter tap for the neutral wire, the contacts 30 and 32 are fastened to the base and a fuse 38 inserted into the clips 31 and 33 connected with these contacts. Then the neutral wire may be connected with one contact, and taken from the other, as indicated by Fig. 7. For testing under these conditions the instruments are connected the same as above described. With a two-wire system these parts are omitted.

This invention is applicable for two-wire or three-wire systems of either the alternating or direct current character. The block is very simple; it provides all the necessary connections and full fuse protection for normal service, and ready means of connecting the desired measuring and testing instruments, without in any way interfering with the current supplied to the customer. The fuses can be easily and quickly manipulated to change the circuits from normal service to testing conditions. When the fuses are arranged as in normal use, both lines are fused each side of the meter, and when the fuses are arranged for testing, both sides of the circuit between the service and the load lines are fused, and also both sides of the circuit through the meter and through the testing instruments are fused.

The invention claimed is:

1. A meter connection fuse block having contacts for service wires, load wires, and meter leads, the contacts for the feed side of the service and load wires being adjacent to each other at one end of the block and the contacts for the return side of the service and load wires being adjacent to each other at the same end, means for fusibly connecting the service wire and load wire contacts with the meter lead contacts, and means for fusibly connecting the adjacent service wire and load wire feed side contacts and for fusibly connecting the adjacent service wire and load wire return side contacts and thus short circuiting the meter lead contacts.

2. A meter connection fuse block having contacts for service wires, load wires, and meter leads, the contacts for the feed side of the service and load wires being adjacent to each other at one end of the block and the contacts for the return side of the service and load wires being adjacent to each other at the same end, fuse clips connected with said contacts, fuses connecting said service wire and load wire contact clips with said meter lead contact clips, and fuse clips connected with said service wire and load wire contacts, said last mentioned clips being spaced between the adjacent feed wire contacts and being spaced between the adjacent return wire contacts the same distance apart as are the first mentioned clips whereby said last mentioned clips will take the same fuses as the first mentioned clips for fusibly connecting and providing a direct path for electric current from the service wire contacts to the load wire contacts.

3. A meter connection fuse block having contacts for service wires, load wires, and meter leads, similar fuse terminals connected with the several contacts, each of the meter lead contacts having a single fuse terminal and each of the service and load wire contacts having two fuse terminals, and fuses connecting the service and load contact fuse terminals with the meter lead fuse terminals in series, a part of said fuses being removable from the series connections and replaceable across the contacts so as to connect the same sides of the service and load wires with each other.

4. A meter connection fuse block having contacts for service wires and load wires, two similar fuse terminals connected with each of said contacts, contacts for meter leads, one fuse terminal of the same type connected with each meter lead contact, and means for connecting testing instruments with the meter lead contacts.

5. A meter connection fuse block having contacts for service wires, load wires, and meter leads, and similar fuse clips for cartridge fuses connected with said contacts, whereby the meter lead contacts and the service and load wire contacts may be fusibly connected by cartridge fuses and whereby the service wire contacts may be fusibly connected directly with the load wire contacts with similar fuses.

6. A meter connection fuse block having service wire contacts, load wire contacts, meter lead contacts, one fuse terminal connected with each meter lead contact, two fuse terminals connected with each service wire contact, and two fuse terminals connected with each load wire contact, the said fuse terminals on the service wire contacts and on the load wire contacts being arranged so as to permit the service and load wire contacts to be fusibly connected with the meter lead contacts and also with each other.

7. A meter connection fuse block having service wire contacts each provided with two spring clips, load wire contacts each provided with two spring clips, meter lead contacts each provided with one spring clip, the contacts for the feed side of the service and load wires being adjacent to each other at one end of the block and the contacts for the return side of the service and load wires being adjacent to each other at the same end, and inclosed fuses adapted to fusibly connect the meter lead contact clips with the service contact clips and the meter lead contact clips with the load contact clips, or connect the same sides of the service and load contact clips together, whereby in the first instance the circuit would be through a meter and in the second instance would be directly to the load.

8. A meter connection fuse block having service wire contacts, each contact having two fuse clips, load wire contacts, each having two fuse clips, meter lead contacts, each having one fuse clip and means for connecting measuring or testing instrument leads, the contacts for the feed side of the service and load wires being adjacent to each other at one end of the block and the contacts for the return side of the service and load wires being adjacent to each other at the same end, and inclosed fuses connecting the fuse clips of the service and load contacts with the fuse clips of the meter lead contacts, said fuses between the meter lead contact clips and the load contact clips being removable therefrom and insertible between the service contact clips and load contact clips to connect the same sides of the circuit together, thereby cutting out the meter lead contacts and making direct connection between the service and the load contacts.

9. A meter connection fuse block having contacts for the connection of service wires, load wires and meter leads, the contacts for the feed side of the service and load wires being adjacent to each other at one end of the block and the contacts for the return side of the service and load wires being adjacent to each other at the same end, fuse terminals connected with said contacts in such manner that the service wires and load wires may be fusibly connected with the meter leads, or the same sides of the service wires may be fusibly connected directly with the load wires by the same fusible means, and means for connecting measuring or testing instruments with the meter lead contacts.

10. A meter connection fuse block having means for the connection of service wires, load wires, meter leads, and testing instruments, the contacts for the feed side of the service and load wires being adjacent to each other at one end of the block and the contacts for the return side of the service and load wires being adjacent to each other at the same end, and fuses normally connecting said service and load connecting means in series with the meter connecting means and adapted to be shifted from said series connection to produce a multiple connection of the meter lead and load wire connecting means.

ROBERT CHAS. COLE.

Witnesses:
HARRY R. WILLIAMS,
JOSEPHINE M. STREMPFER.